United States Patent [19]

Takai

[11] Patent Number: 4,988,593

[45] Date of Patent: Jan. 29, 1991

[54] AZO COMPOUND CONTAINING ELECTROPHOTOGRAPHIC PHOTOSENSITIVE MEMBER

[75] Inventor: Hideyuki Takai, Yokohama, Japan

[73] Assignee: Canon Kabushiki Kaisha, Tokyo, Japan

[21] Appl. No.: 409,785

[22] Filed: Sep. 20, 1989

[30] Foreign Application Priority Data

Oct. 3, 1988 [JP] Japan .................. 63-250251

[51] Int. Cl.$^5$ .................. G03G 5/047; G03G 5/06
[52] U.S. Cl. .................. 430/58; 430/70; 430/72; 430/74; 430/75; 430/76; 430/77; 430/78; 430/79; 534/653; 534/657; 534/753; 534/796
[58] Field of Search .................. 430/58, 59, 70, 72, 430/74, 75, 76, 77, 78, 79

[56] References Cited

U.S. PATENT DOCUMENTS

| | | | |
|---|---|---|---|
| 4,314,016 | 2/1982 | Ohta et al. | 430/59 |
| 4,359,515 | 11/1982 | Katagiri et al. | 430/76 X |
| 4,702,982 | 10/1987 | Matsumoto et al. | 430/72 |
| 4,735,882 | 4/1988 | Yamashita et al. | 430/58 |
| 4,810,607 | 3/1989 | Matsumoto et al. | 430/73 |
| 4,939,053 | 7/1990 | Ueda | 430/58 |

FOREIGN PATENT DOCUMENTS

| | | | |
|---|---|---|---|
| 56-005553 | 1/1981 | Japan . | |
| 56-150751 | 11/1981 | Japan . | |
| 63-244045 | 10/1988 | Japan | 430/78 |
| 63-244046 | 10/1988 | Japan | 430/72 |
| 63-244048 | 10/1988 | Japan | 430/72 |

*Primary Examiner*—Roland Martin
*Attorney, Agent, or Firm*—Fitzpatrick, Cella, Harper & Scinto

[57] ABSTRACT

An electrophotographic photosensitive member having a photosensitive layer is formed on a support and contains an azo pigment expressed by a general formula [I] or [II]:

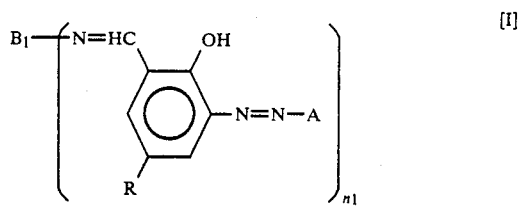

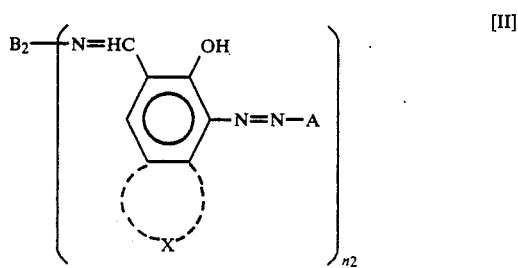

where A, $B_1$ and $B_2$ are aromatic hydrocarbon nucleus groups or heterocyclic groups which may be optionally linked by coupler groups, A is an univalent group, $B_1$ is an univalent, bivalent or trivalent group, and $B_2$ is a bivalent or trivalent group; X is a residue necessary for forming a polycyclic aromatic nucleus or a heterocycle by condensation with a benzene nucleus; R is a halogen atom, an alkyl group or an alkoxy group; $n_1$ is an integer from 1 to 3; and $n_2$ is an integer from 1 to 3. This photosensitive layer may be composed of a charge generation layer containing the above azo pigment and a charge transport layer.

6 Claims, No Drawings

AZO COMPOUND CONTAINING ELECTROPHOTOGRAPHIC PHOTOSENSITIVE MEMBER

BACKGROUND OF THE INVENTION

1. Field of the Invention

This invention relates generally to an electrophotographic photosensitive member and relates more particularly to an electrophotographic photosensitive member containing an azo pigment having a particular coupler structure.

2. Description of the Prior Art

Conventionally, inorganic photoconductive materials such as selenium, cadmium sulfide and zinc oxide are generally used to form an electrophotographic photosensitive member.

An electrophotographic photosensitive member composed of organic photoconductive materials are known which include those having photoconductive polymers represented by poly N-vinylcarbazole or low molecular weight organic photoconductive materials such as 2,5-bis(p-diethylaminophenol)-1,3,4-oxadiazole, and those having combinations of these organic photoconductive materials and various kinds of dyes or pigments.

Electrophotographic photosensitive members based on the use of organic photoconductive materials are advantageous in that they can be produced with a very high productivity and at low cost because they have improved film formation properties and can be formed by coating. Also, the chromatic properties of this type of photosensitive member can be freely controlled by selecting dyestuffs or pigments to be contained. This type of photosensitive member has been widely studied because of these advantages, although the sensitivity and durability thereof are usually unsatisfactory. Recently, a function distribution type of photosensitive member has been developed which is based on lamination of a charge generation layer containing organic photoconductive dyestuffs or pigments and a charge transport layer containing a photoconductive polymer or a low molecular weight organic photoconductive material of the above mentioned type, which member is thereby remarkably improved in sensitivity and durability.

Azo pigments have superior photoconductivity and can be easily changed in various characteristics by selecting the proper combination of amino components and coupler components. Various azo pigment compounds have, therefore, been proposed including the ones that are disclosed in Japanese Patent Laid Open Nos.56 1944, 56-5553, and 56-150751 which relate to the present invention.

However, the properties of conventional electrophotographic photosensitive members having azo pigments are unsatisfactory in terms of sensitivity or potential stability during repeated use. Accordingly, there are few conventional photosensitive members which have been put to practical use.

SUMMARY OF THE INVENTION

It is an object of the present invention to provide an electrophotographic photosensitive member formed of a novel photoconductive material.

It is another object of the present invention to provide an electrophotographic photosensitive member having practical high-sensitivity characteristics and potential characteristics stable during repeated use.

A study made by the inventors of the present invention has revealed that the above-described problems can be solved by forming a photosensitive layer containing an azo pigment utilizing a coupler having a specific structure. The present invention therefore provides an electrophotographic photosensitive member having an electroconductive support and a photosensitive layer formed on the support and containing an azo pigment expressed by a general formula [I] or [II]:

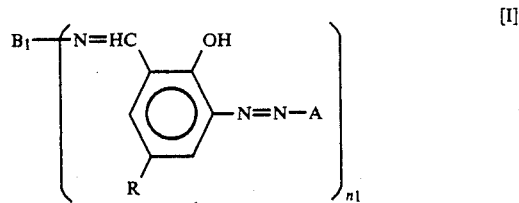

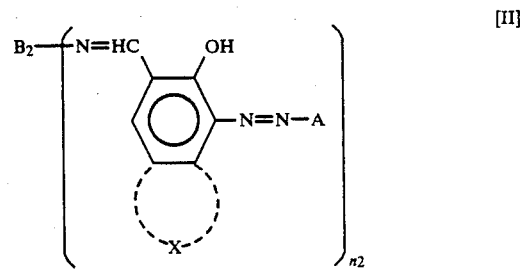

where A, $B_1$ and $B_2$ are aromatic hydrocarbon nucleus groups which may be linked by coupler groups or heterocylic groups which may be linked by coupler groups, A is an univalent group, $B_1$ is an univalent, bivalent or trivalent group, and $B_2$ is a bivalent or trivalent group; X is a residue necessary for forming a polycyclic aromatic nucleus or a heterocycle by condensation with a benzene nucleus; R is a halogen atom, an alkyl group or an alkoxy group; $n_1$ is an integer from 1 to 3; and $n_2$ is an integer from 1 to 3.

DESCRIPTION OF THE PREFERRED EMBODIMENT

The aromatic hydrocarbon nucleus groups and heterocyclic groups represented by A, $B_1$ and $B_2$ in the above formulas may be selected from groups derived from aromatic hydrocarbon nuclei such as benzene, naphthalene, fluorene, phenanthrene, anthracene and pyrene, and groups derived from heterocyclic groups such as furan, thiophene, pyridine, indole, benzothiazole, carbazole, acridone, dibenzothiophene, benzoxazole, benzotriazole, oxadiazole and thiazole. Other applicable aromatic hydrocarbon groups linked by coupler groups and other applicable heterocyclic groups linked by coupler groups are, for example, those formed by directly linking the above aromatic hydrocarbon nuclei or heterocycles or by indirectly linking these nuclei with aromatic groups or non-aromatic groups or, more specifically, groups derived from triphenylamine, diphenylamine, N-methyldiphenylamine, biphenyl, terphenyl, binaphthyl, fluorenone, phenanthrenequinone, anthraquinone, benzanthrone, diphenyloxadiazole, phenylbenzoxazole, diphenylmethane, diphenylsulfone, diphenyl ether, benzophenone, stilbene and distyrylbenzene.

The aromatic hydrocarbon nucleus groups that may be linked by coupler groups and the aromatic heterocyclic groups that may be linked by coupler groups may have substituent groups which may be selected from alkyl groups such as methyl, ethyl, propyl and butyl, alkoxy groups such as methoxy and ethoxy, dialkylamino groups such as dimethylamino and diethylamino, halogen atoms such as fluorine, chloride and bromine, nitro groups, cyano groups and halomethyl groups.

R is, for example, a halogen atom such as fluorine, chloride or bromine, an alkyl group such as methyl, ethyl or propyl, and an alkoxy group such as methoxy or ethoxy.

X is, for example, a residue necessary for forming, by condensation with a benzene nucleus, a heterocyclic nucleus such as a naphthalene nucleus, an anthracene nucleus, a benzocarbazole nucleus or a dibenzofuran nucleus. This residue may have a substituent group which may be selected from alkyl groups such as methyl, ethyl, propyl and butyl, alkoxy groups such as methoxy and ethoxy, halogen atoms such as fluorine, chloride and bromine, nitro groups, cyano groups and halomethyl groups.

The following is a list of compounds representative of azo pigments used for the present invention. However, azo pigments in accordance with the present invention are not limited to these compounds.

(I)-1 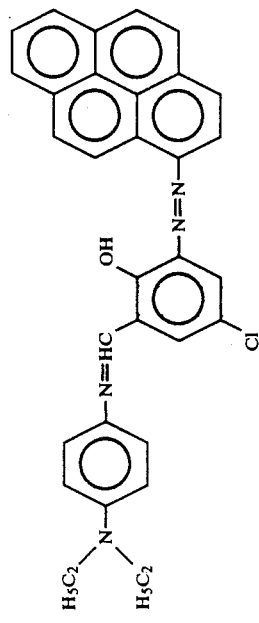
(I)-2 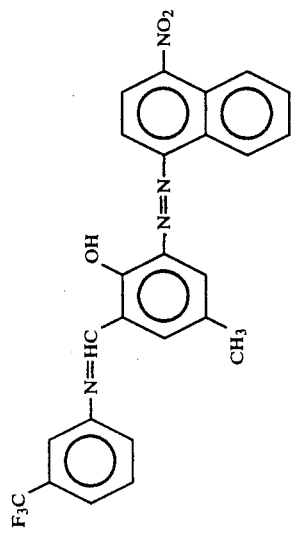
(I)-3 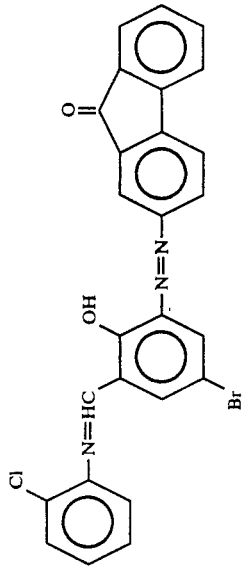
(I)-4 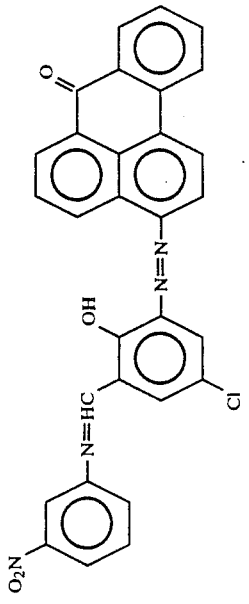

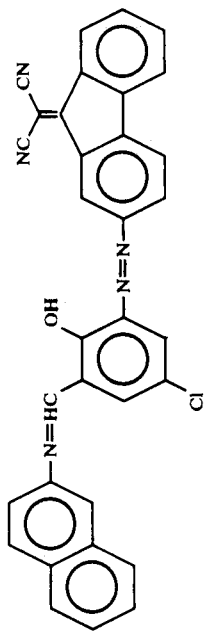
(2)-5
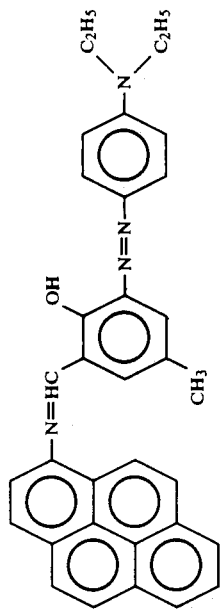
(1)-6
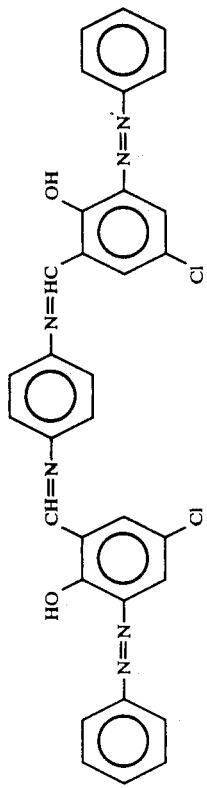
(2)-1
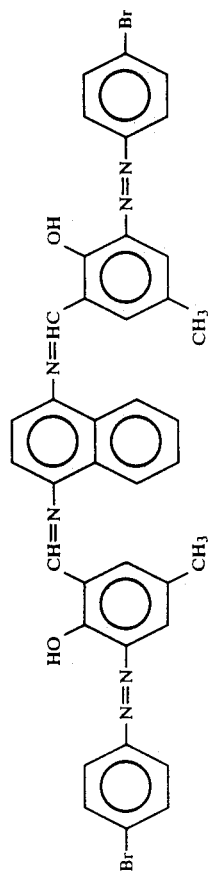
(2)-2

-continued
(2)-3 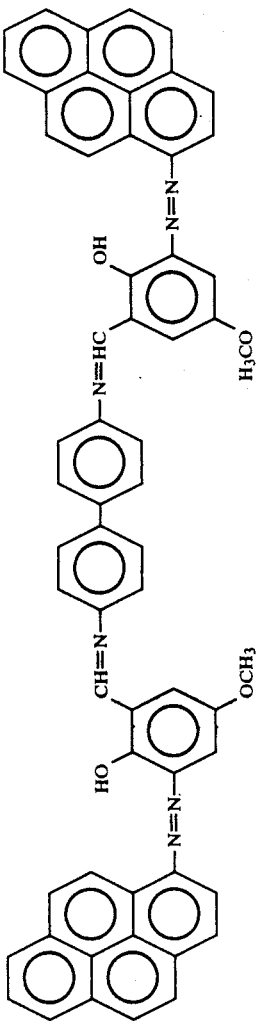
(2)-4 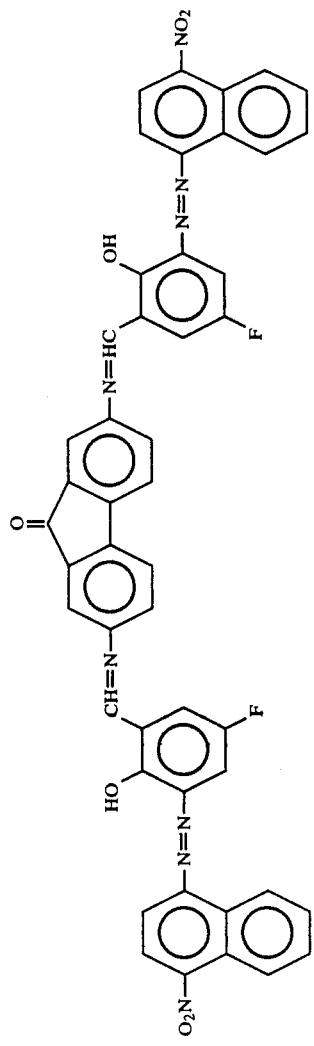
(2)-5 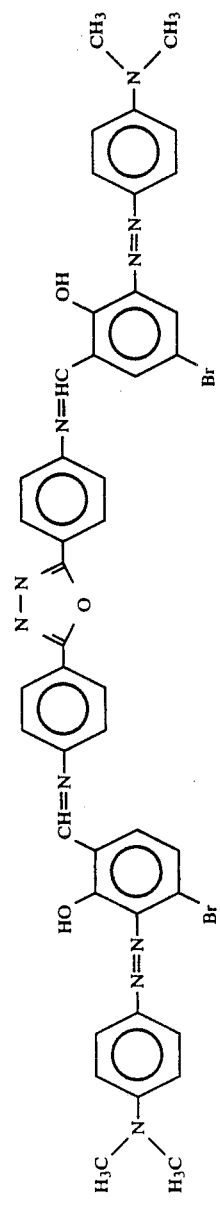
(2)-6 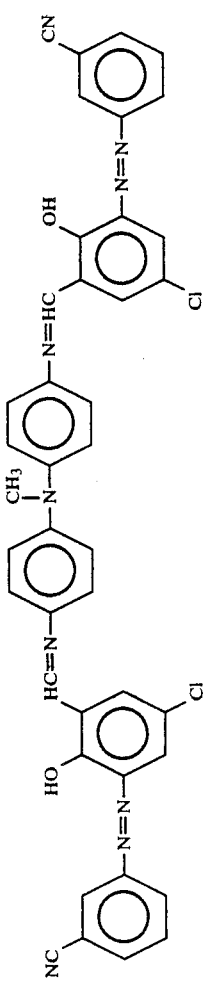

-continued
(2)-7
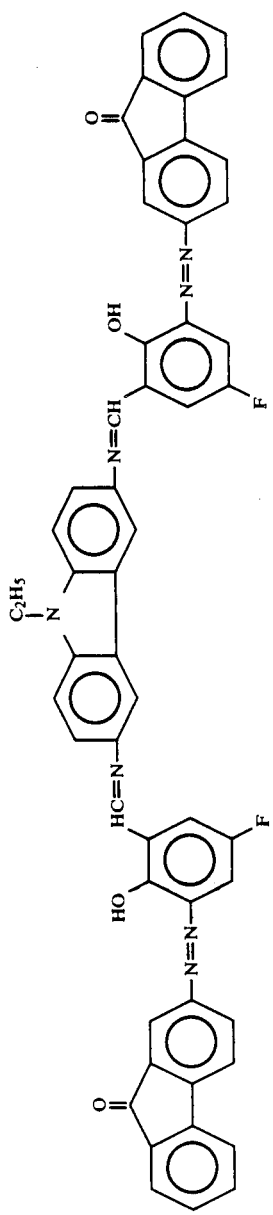
(2)-8
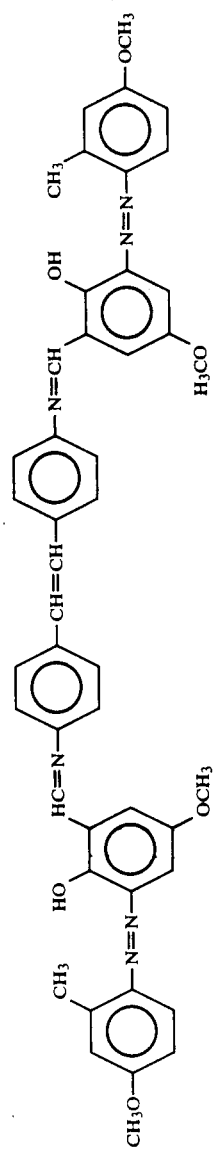
(2)-9
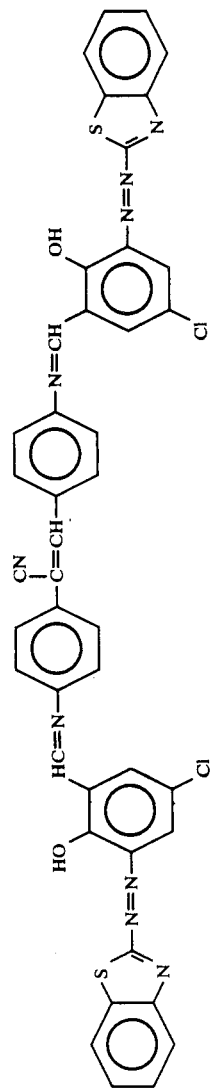
(2)-10
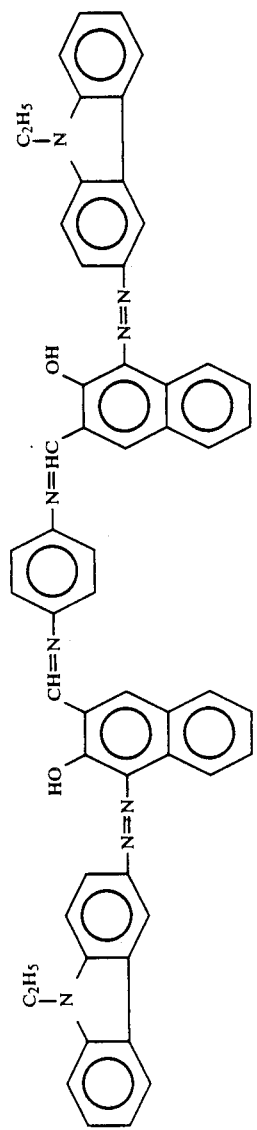

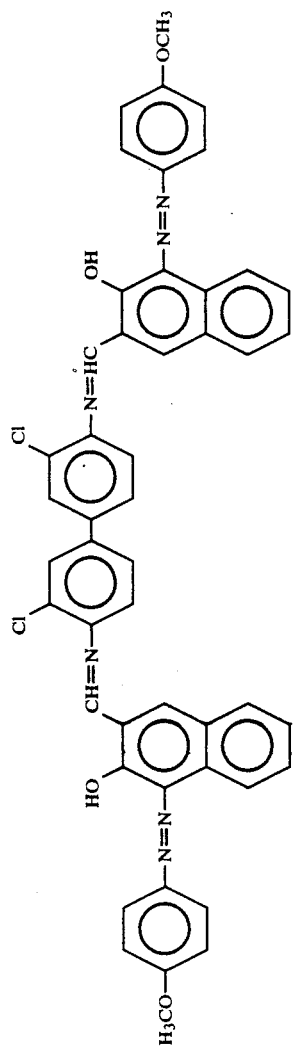
(2)-11
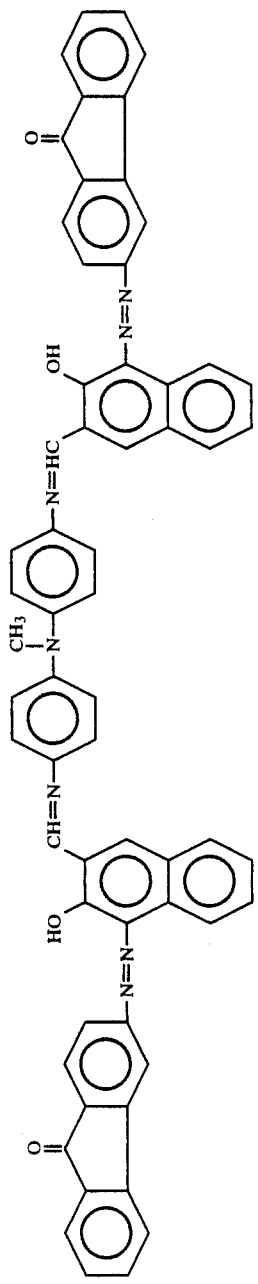
(2)-12
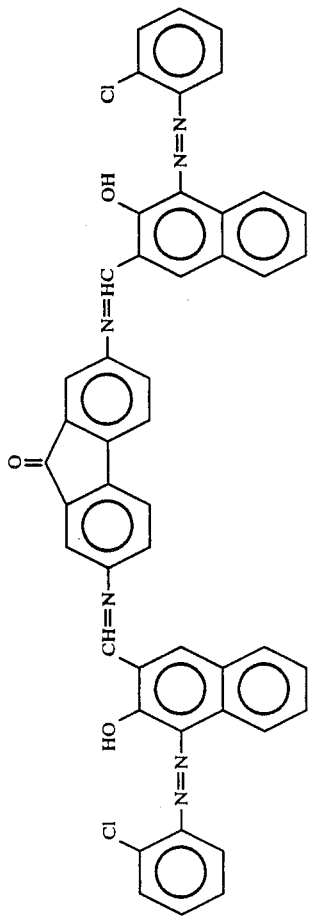
(2)-13

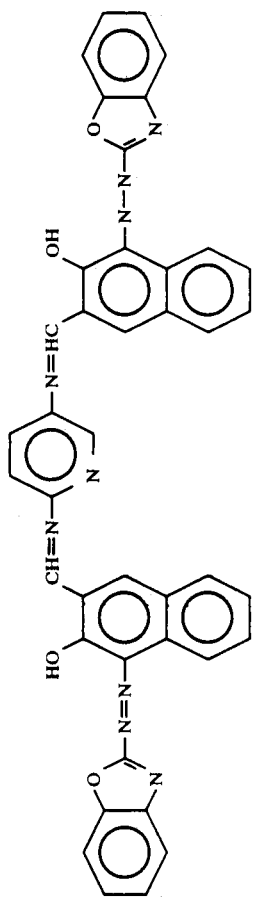
(2)-14
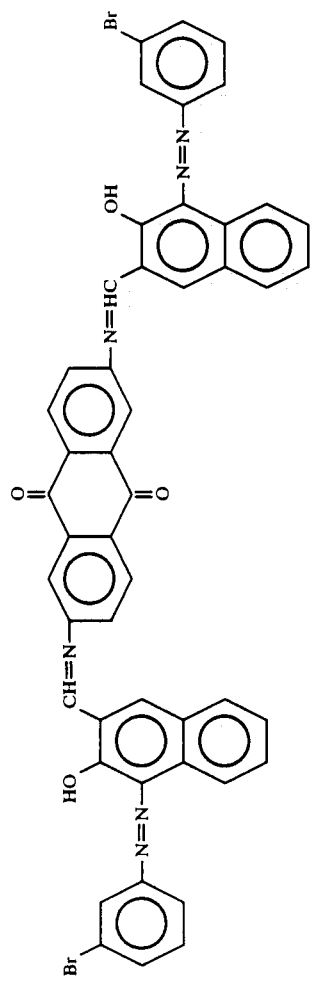
(2)-15
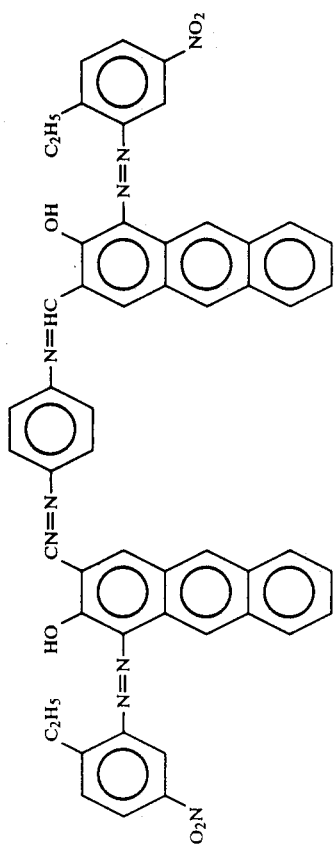
(2)-16

-continued
(2)-17
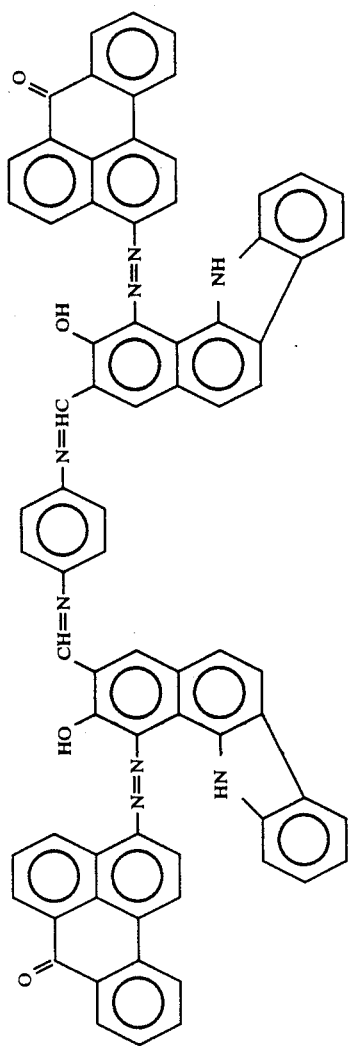
(2)-18
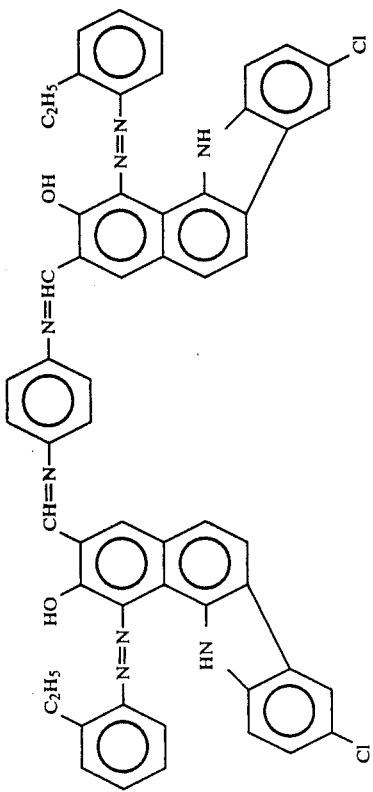

-continued
(2)-19
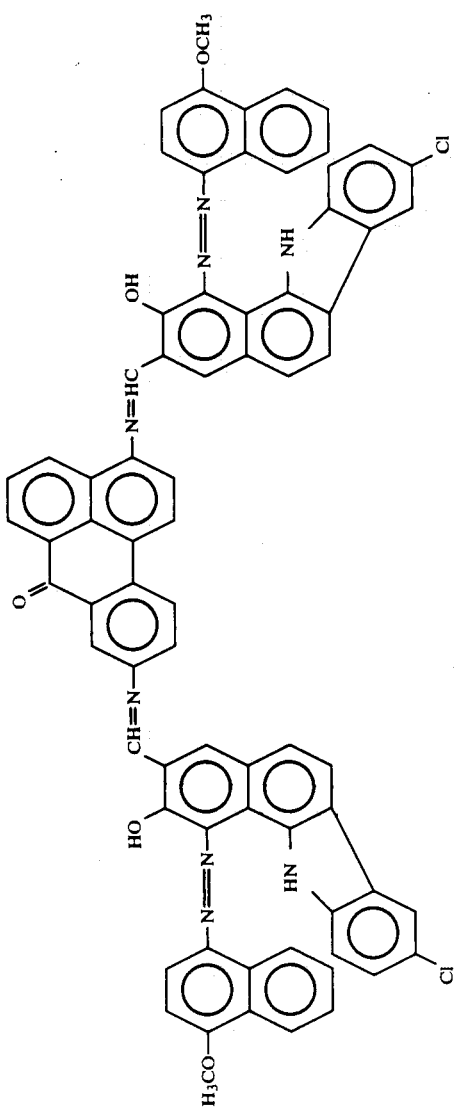
(2)-20
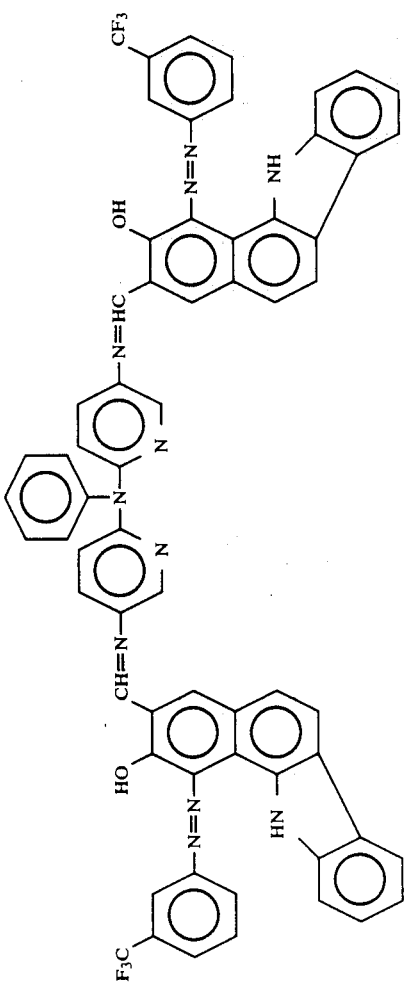

(2)-21
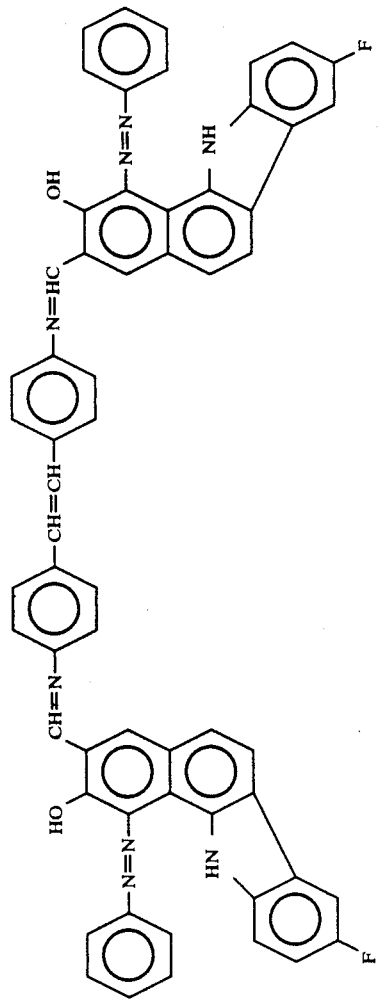
(2)-22
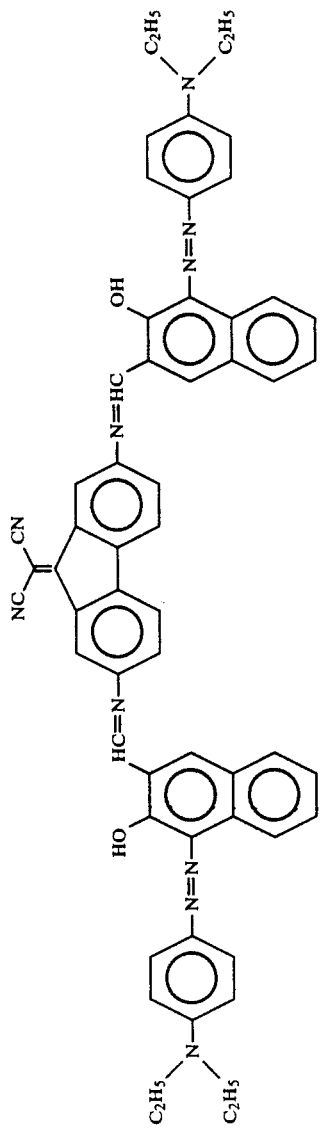
(2)-23
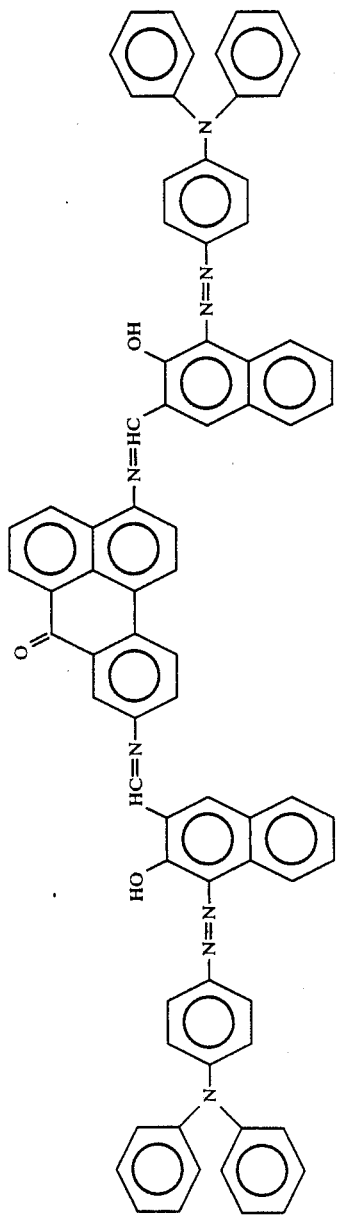

-continued
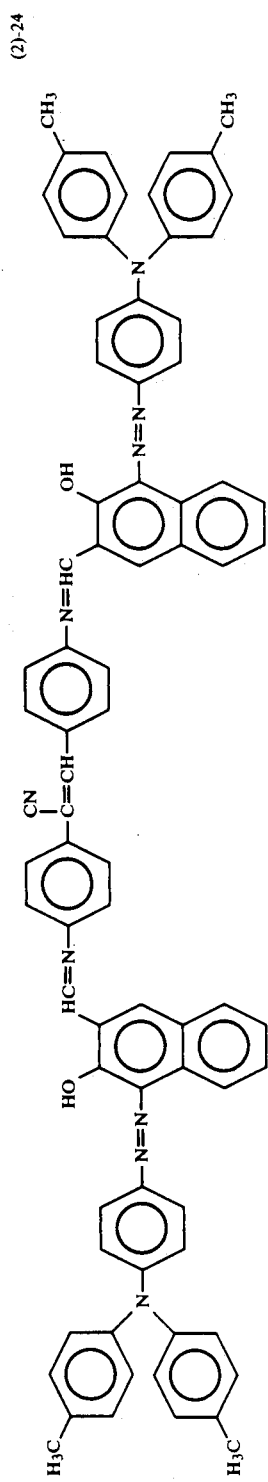
(2)-24
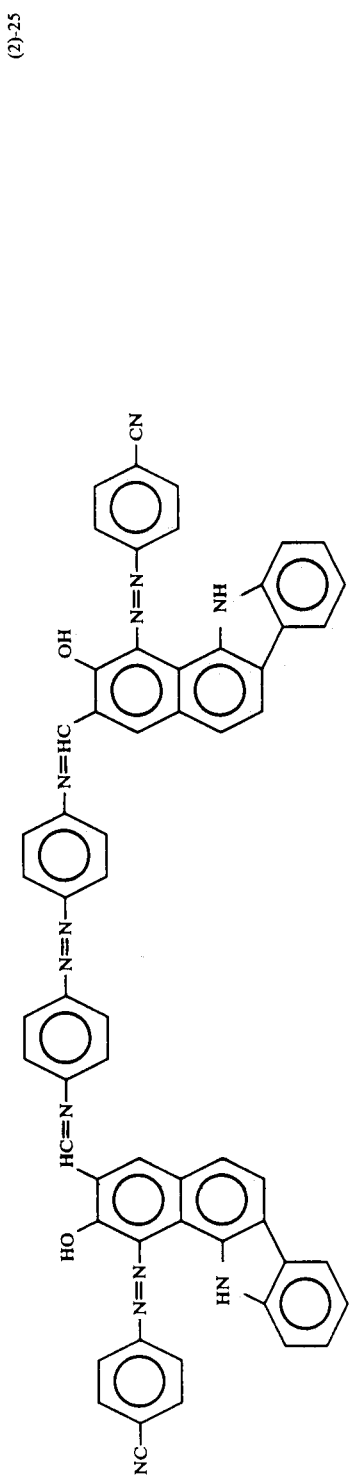
(2)-25
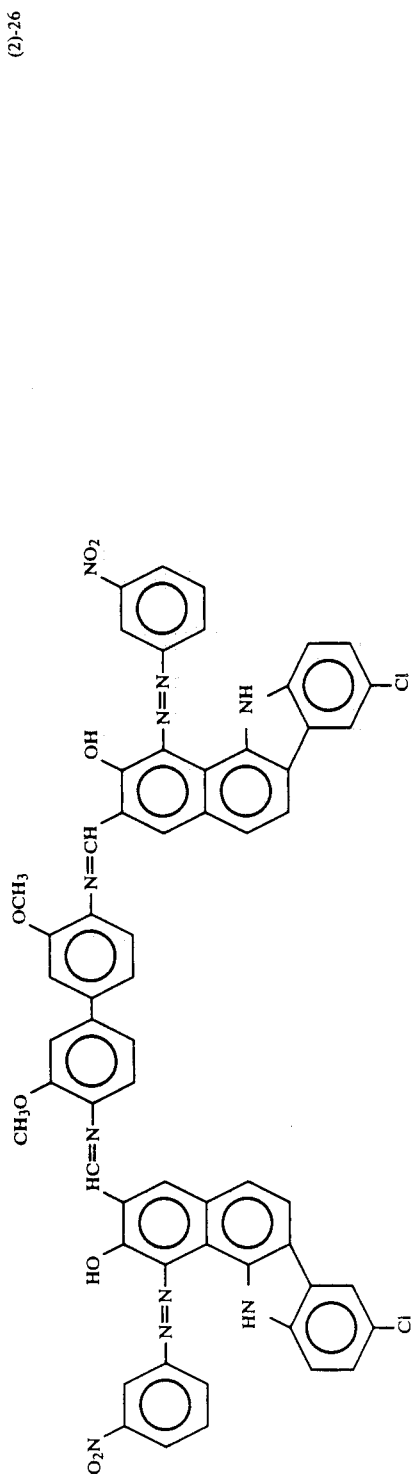
(2)-26

-continued
(2)-27
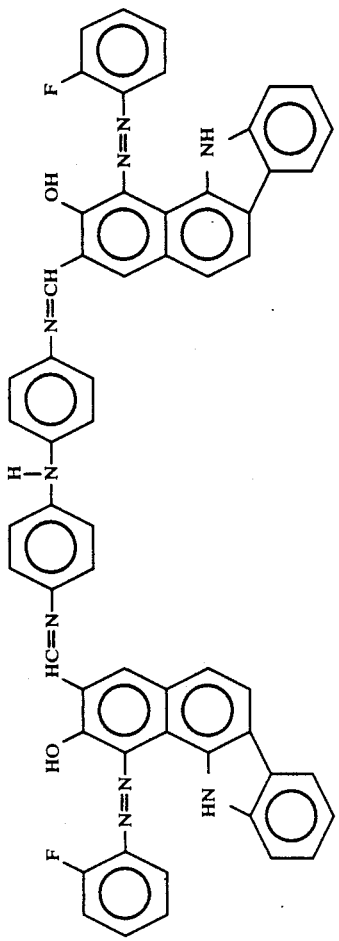
(3)-1
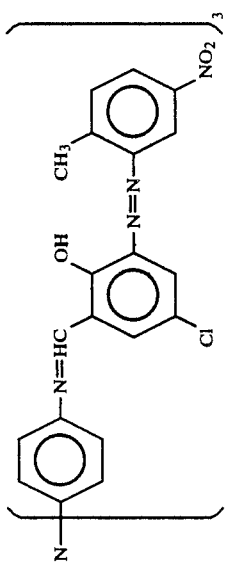
(3)-2
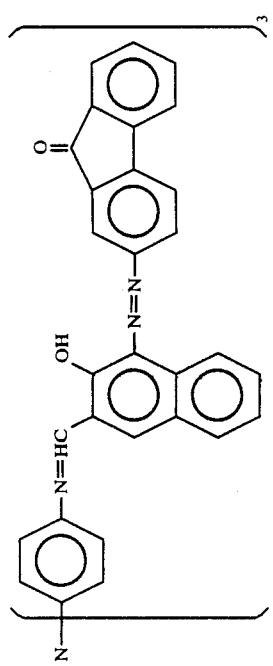

-continued
(3)-3 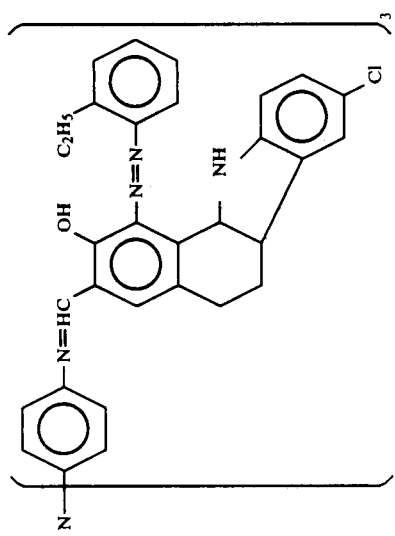
(3)-4 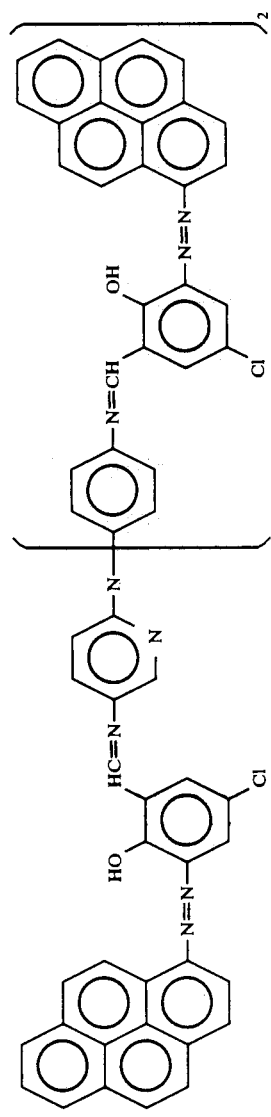
(3)-5 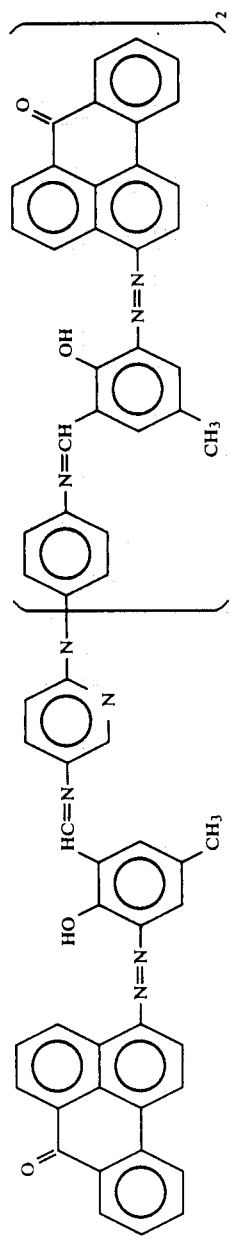

-continued
(3)-6
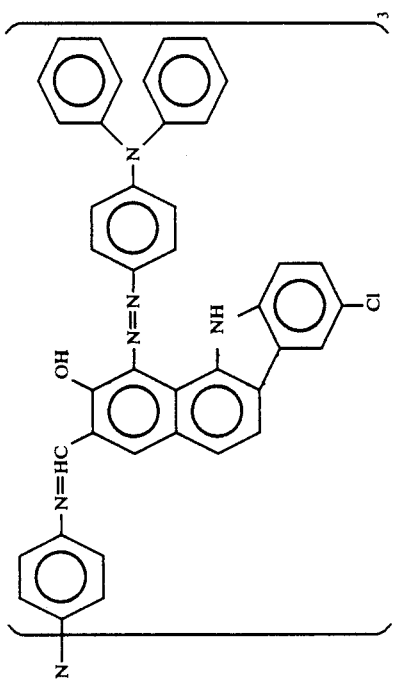
(3)-7
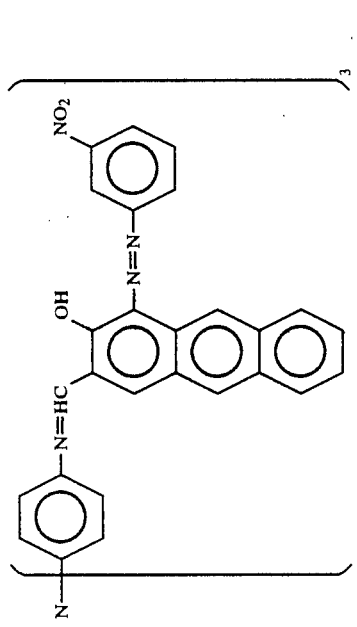
(3)-8
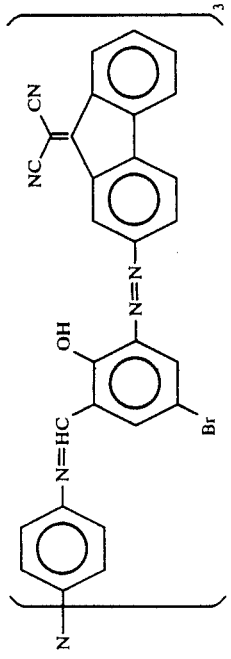

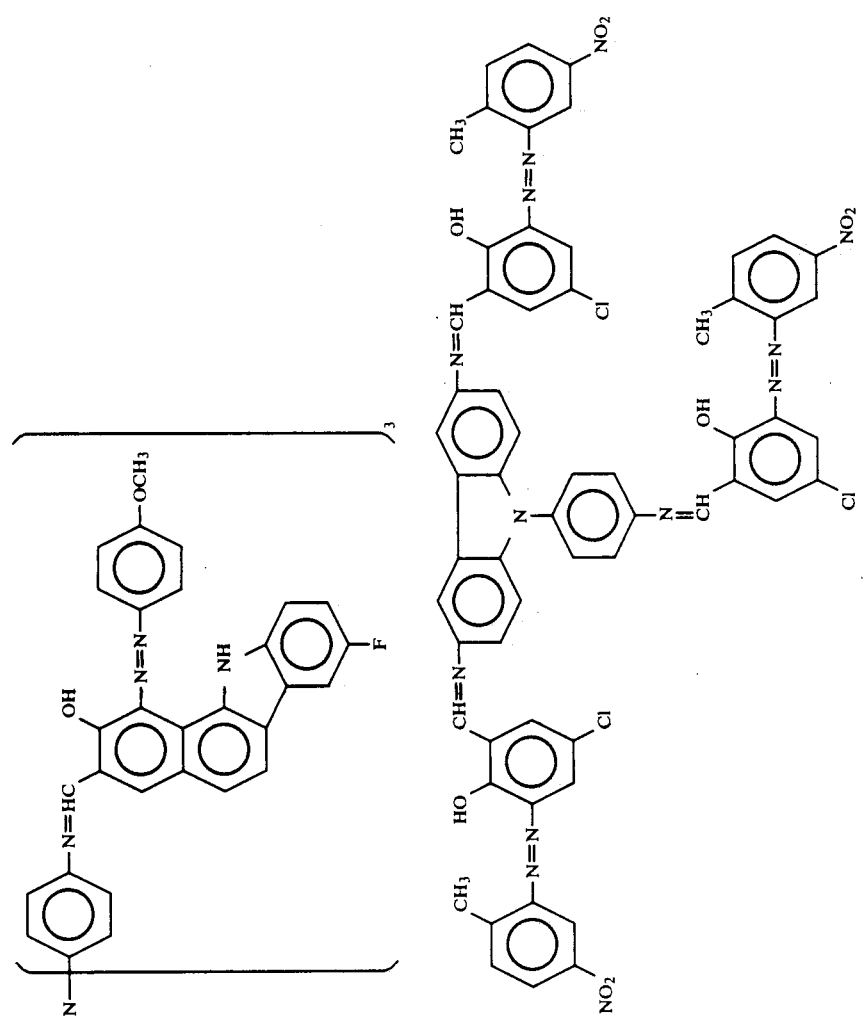

Azo pigments used for the present invention are synthesized by diazotizing an amine represented by a general formula A-NH$_2$ [III] (wherein A is the same as A in general formulas [I] and [II]) by conventional methods, isolating the diazotized amine as a soluble salt, such as a borofluoride and coupling the same with a coupler component expressed by a general formula:

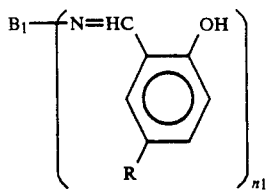

[IV]

(where R, B$_1$, and n$_1$ are equivalent to R, B$_1$, and n$_1$ in general formula [I]) or

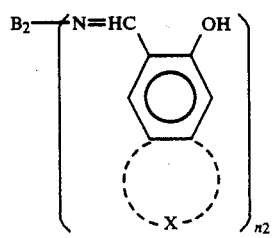

[V]

(where X, B$_2$, and n$_2$ are equivalent to X, B$_2$, and n$_2$ in general formula [I]). The coupler expressed by the general formula [IV] or [V] is synthesized by condensation of an aldehyde expressed by a general formula:

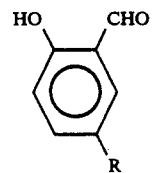

[VI]

and an amine expressed by a general formula:

B$_1$( NH$_2$)$_{n1}$   [VII]

or by condensation of an aldehyde expressed by a general formula:

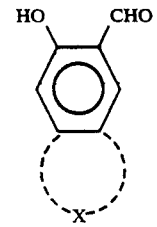

[VIII]

and an amine expressed by a general formula:

B$_2$(NH$_2$)$_{n2}$   [IX]

Azo pigments in accordance with the present invention can also be synthesized by another method in which the above diazonium salt and aldehyde expressed by the general formula [VI] or [VIII] are coupled to form, $$A-N=N-\underset{R}{\underset{|}{\bigcirc}}-\overset{HO}{\phantom{-}}\overset{CHO}{\phantom{-}} \quad \text{or} \quad A-N=N-\underset{\cdot X\cdot}{\underset{|}{\bigcirc}}-\overset{HO}{\phantom{-}}\overset{CHO}{\phantom{-}}$$

and condensation of this compound and the amine expressed by [IX] is effected.

Next, an example of synthesis of an azo pigment in accordance with the present invention will be described below.

Example of synthesis (synthesis of azo pigment No.(2)-10 shown in the above list)

100 ml of water and 10 ml (0.12 mol) of concentrated hydrochloric acid and 5.0 g (0.024 mol) of

[structure: N-ethylcarbazole with NH$_2$ substituent, with C$_2$H$_5$ on N]

were introduced into a 300 ml beaker and were cooled to 0° C. A solution prepared by dissolving 2.1 g (0.030 mol) of sodium nitrite in 5 ml of water was added dropwise for 10 minutes to the former solution while being maintained at 5° C., followed by agitation for 15 minutes and then carbon filtration. To this solution was added dropwise under agitation a solution prepared by dissolving 5.2 g (0.048 mol) of sodium borofluoride in 50 ml of water. The borofluoride product which precipitated out was removed by filtration, was washed with cool water, was then washed with acetonitrile and was dried at a reduced pressure and at room temperature. 5.5 g of the borofluoride product was obtained in a 74.1% yield.

1.0 g (0.058 mol) of 3-hydroxy-2-naphthaldehyde and 3.1 g (0.029 mol) of p phenylenediamine were boiled in 300 ml of 2-butanol for one hour; the precipitate was separated by filtration and purified, thereby synthesizing 9.9 g of a coupler represented by the following structural formula in a 82.3% yield.

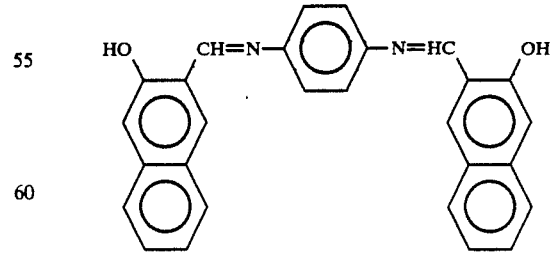

Next, 5.0 g (0.012 mol) of the thus-obtained coupler was dissolved in a solution prepared by adding 75 ml of 10% sodium hydroxide aqueous solution to 600 ml of DMF. To this solution was added dropwise a solution prepared by dissolving 7.4 g (0.024 mol) of the borofluoride product obtained in the above-described manner in 15 ml of DMF, and the resulting solution was agitated for two hours. Acetic acid was added to this reaction solution to precipitate a pigment. The pigment was filtered out, washed with water, by DMF then by water. The purified product was frozen and dried. 8.3 g of the pigment was obtained in a 80.5% yield.

| | Elemental Analysis | |
|---|---|---|
| | Calculated value (%) | Measured value (%) |
| C | 78.29 | 78.35 |
| H | 4.94 | 5.04 |
| N | 13.05 | 13.08 |

The electrophotographic photosensitive member in accordance with the present invention has a photosensitive layer which contains the azo pigment represented by the general formula [I] or [II] and which is formed on an electroconductive support. The photosensitive layer may be a single layer or a multi-layer structure. However, it is specifically preferable to adopt a function distribution type of photosensitive layer consisting of a charge generation layer formed of a photosensitive layer containing the azo pigment represented by the general formula [I] or [II] and a charge transport layer containing a charge transporting material and laminated on the charge generation layer.

The charge generation layer may be formed by applying a coating liquid comprising the above-described azo pigment dispersed in a binder resin and a suitable solvent, over an electroconductive support by any well-known method to form a thin coating layer. Preferably, the thickness of the coating is, for example, 5 μm or more preferably, 0.1 to 1 μm.

The binder resin for this coating is selected from various insulating resins or organic photoconductive polymers. Preferably, the binder resin is polyvinyl butyral, polyvinyl benzal, polyallylate, polycarbonate, polyester, phenoxy resin, cellulose resin, acrylic resin or urethane resin. The proportion of this resin contained in the charge generation layer is 80% or less by weight or, preferably, 40% or less by weight.

Preferably, the solvent is selected from those capable of dissolving the binder resin, but incapable of dissolving the charge transport layer or undercoat layer. Such solvents are, for example, ethers, such as tetrahydrofuran and 1,4-dioxane, ketones such as cyclohexane and methyl ethyl ketone, amides such as N,N-diethylformamide, esters, such as methyl acetate and ethyl acetate, aromatic compounds, such as toluene, xylene and monochlorobenzene, alcohols, such as methanol, ethanol and 2-propanol, and halogenated aliphatic hydrocarbons, such as chloroform and methylene chloride.

The charge transport layer is laminated over or under the charge generation layer and has the function of receiving charge carriers from the charge generation layer under the existence of an electric field and transport the carriers to the surface. The charge transport layer is formed by coating a liquid prepared by dissolving a desirable charge transporting material and a suitable binder in a solvent. The thickness of the coated layer is ordinarily 5 to 40 μm or, preferably, 15 to 30 μm.

The charge transporting material is an electron transport material or a positive hole transport material. The electron transport material may be selected from electron withdrawing materials, such as 2,4,7-trinitrofluorenone, 2,4,5,7-tetranitrofluorenone, chloranil and tetracyanoquinodimethane and polymers of these electron withdrawing material.

The positive hole transport material may be selected from polycyclic aromatic compounds, such as pyrene and anthracene, heterocyclic compounds, such as carbazole, indole, imidazole, oxazole, thiazole, oxadiazole, pyrazole, pyrazoline, thiadiazole and triazole, hydrazone compounds, such as p-diethylaminobenzaldehyde-N,N-diphenylhydrazone, and N,N-diphenylhydrazino-3-methylidene-9-ethylcarbazole, styryl compounds, such as α-phenyl-4'-N,N-diphenylaminostilbene, 5-[4-(di-p-trilamino)benzylidene]-5H-dibenzo[a,d]cycloheptene, benzidine compounds, triallylmethane compounds, triphenylamine, and polymers having groups formed of these compounds as main- or side-chains (e.g., poly N vinylcarbazole or polyvinyl anthracene).

Inorganic materials such as selenium, selenium-tellurium, amorphous silicon and cadmium sulfide can also be used as the charge transporting material apart from these organic compounds.

One of these compounds or materials or a combination of two or more of them can be used as the charge transporting material.

If the film formation properties of the charge transporting material are unsatisfactory, a suitable binder resin may be used. Examples of the binder are insulating resins such as acrylic resin, polyallylate, polyester, polycarbonate, polystyrene, acrylonitrile styrene copolymer, polysulfone, polyacrylamide, polyamide and chlorinated rubber and organic photoconductive polymers, such as poly-N-vinylcarbazole and polyvinylanthracene.

The electroconductive support on which the photosensitive layer is formed is formed of, for example, aluminum, aluminum alloy, stainless steel, titanium or nickel. Alternatively, it may be formed of a plastic sheet on which a layer of such a metal or alloy is formed by vacuum deposition, a plastic plate or the above type of metallic plate coated with conductive particles (e.g., carbon black, silver particles, titanium oxide) mixed with a suitable binder, or a plastic or paper sheet impregnated with conductive particles.

An undercoat layer may be formed between the electroconductive support and the photosensitive layer to serve as a barrier and as a bonding agent. The thickness of the undercoat layer is 5 μm or less or, preferably, 0.1 to 3 mm. The undercoat layer may be formed from casein, polyvinyl alcohol, nitrocellulose, polyamide (nylon 6, nylon 6,6, nylon 6,10, copolymer nylon, alkoxymethylated nylon and so on), polyurethane, or aluminum oxide.

The present invention also comprises a type of electrophotographic photosensitive member in which the above-described azo pigment and charge transporting material are contained in the same layer. In this case, a charge transfer complex composed of poly-N-vinylcarbazole and trinitrofluorenone may be used as the charge transporting material.

This example of electrophotographic photosensitive member can be formed by dispersing the above-described azo pigment and charge transporting material into a suitable resin solution and applying and drying this solution.

In either type of electrophotographic photosensitive member, the azo pigment represented by the general formula [I] or [II] may have any crystal form; that is, it may be crystalline or amorphous. It is possible to use, in accordance with requirements, a combination of two or more of the azo pigments represented by the general formula [I] or [II] or to use such a combination with a well-known type of charge generation material.

A protective layer may be formed over the photosensitive layer to improve the durability thereof.

The electrophotographic photosensitive member in accordance with the present invention can be used not only in electrophotographic copiers, but also in various fields of applied electrophotography relating to laser beam printers, CRT printers, LED printers, liquid crystal printers, laser photoengraving and the like.

EXAMPLES 1 TO 22

A liquid prepared by dissolving 5 g (number-average molecular weight: 32,000) of methoxymethylated nylon resin and 10 g of (number-average molecular weight: 29,000) of alcohol soluble copolymer nylon resin in 95 g of methanol was applied to an aluminum base with a Meyer bar, thereby forming an undercoat layer having a thickness of 1 μm after drying.

Next, 5 g of the azo pigment No.(2)-1 shown in the above list was added to a liquid prepared by dissolving 2 g of butyral resin (degree of butyralation: 63 mol %) in 95 g of cyclohexane and was dispersed by being processed with a sand mill for 20 hours. This dispersion liquid was applied with a Meyer bar over the previously formed undercoat layer so that the coating had a thickness of 0.2 μm after drying, thereby forming a charge generation layer.

Then, 5 g of a hydrazone compound represented by the following structural formula:

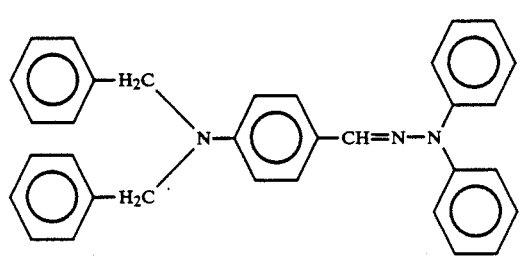

provided as a charge transporting material and 5 g (number-average molecular weight: 100,000) of polymethy methacrylate resin were dissolved in 40 g of monochlorobenzene. This liquid was applied over the charge generation layer with a Meyer bar and was dried, thereby forming a charge transport layer having a thickness of 20 μm. A photosensitive member was thus formed as Example I.

Other photosensitive members were formed as Examples 2 to 22 in the same manner by using other pigments shown in Table 1 in place of the azo pigment No.(2) 1.

Electrification characteristics of the electrophotographic photosensitive member made in this manner were evaluated by a process in which the photosensitive members were electrified by a corona discharge at −5 kv effected by using an electrostatic copier testing apparatus made by Kawaguchi Denki Co., Ltd. (Model SP-428). After charging, the electrophotographic photosensitive members were left in a dark condition for one second and were thereafter exposed to the light of a halogen lamp at an illuminance of 10 luxes to thereby measure a surface potential Vo and an exposure value E½ necessary for reducing the surface potential to half. Table 1 shows the results of this test.

TABLE 1

| Example | Azo pigment No. | Vo (−v) | E½ (lux · sec) |
|---|---|---|---|
| 1 | (2)-1 | 680 | 2.0 |
| 2 | (2)-2 | 690 | 2.3 |
| 3 | (2)-3 | 695 | 1.8 |
| 4 | (2)-4 | 680 | 2.5 |
| 5 | (2)-10 | 700 | 1.6 |
| 6 | (2)-11 | 705 | 1.5 |
| 7 | (2)-12 | 675 | 2.4 |
| 8 | (2)-13 | 700 | 1.5 |
| 9 | (2)-14 | 680 | 2.5 |
| 10 | (2)-15 | 690 | 2.2 |
| 11 | (2)-16 | 700 | 2.6 |
| 12 | (2)-17 | 680 | 1.7 |
| 13 | (2)-18 | 685 | 1.5 |
| 14 | (2)-19 | 690 | 1.4 |
| 15 | (2)-20 | 700 | 2.0 |
| 16 | (2)-21 | 710 | 2.2 |
| 17 | (1)-1 | 690 | 2.8 |
| 18 | (1)-2 | 680 | 2.6 |
| 19 | (1)-3 | 700 | 2.2 |
| 20 | (3)-1 | 675 | 2.5 |
| 21 | (3)-2 | 680 | 2.0 |
| 22 | (3)-3 | 690 | 1.6 |

Comparison Example 1

A sensitized sheet for electrophotography was prepared which was the same as Example 6 except that an azo pigment represented by the following structural formula was used in place of the azo pigment used in Example 6.

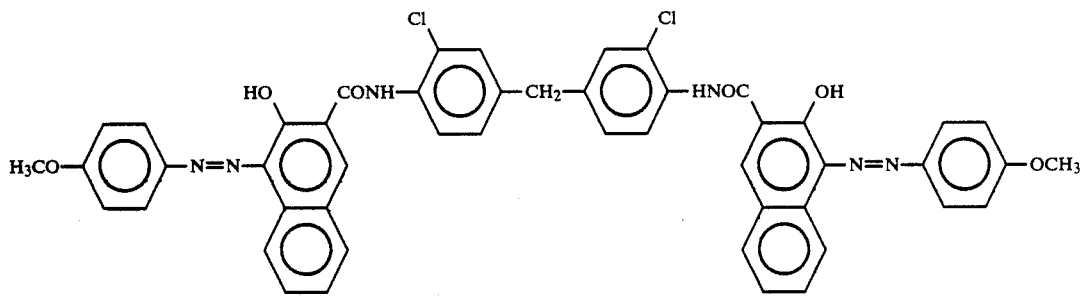

Electrification characteristics of this comparison example were evaluated in the same manner, and the results of the evaluation test were as follows.

Vo: 650 (−V)  E1/2: 4.5 (lux.sec)

These results show that each of the photosensitive members of the present invention has satisfactory electrification characteristics and an improved sensitivity.

EXAMPLES 23 TO 27

Each of photosensitive members made in the same manner as Example 1 was attached to a cylinder of an electrophotography copier having a device for effecting corona discharge at −6.5 kv, an optical system for exposure, a development device, a transfer/electrification device, an optical system for electricity removing exposure, and a cleaner.

An initial potential $V_D$ of a dark portion and an initial potential $V_L$ of a light portion were set to about (∼)700 v and (∼)200 v, respectively, and the change ($\Delta V_D$) in the dark portion potential and the change ($\Delta V_L$) in the light portion potential were measured after repeated use of the photosensitive member 5,000 times. Photosensitive members made in accordance with Examples 6, 8, 13, and 22 were evaluated in the same manner. Table 2 shows the results of the evaluation. In this table, the negative symbol attached to the values indicating the changes in each potential indicates that the absolute value of the potential was reduced, while the positive symbol indicates that the absolute value of the potential was increased.

TABLE 2

| Example | Photosensitive member | $\Delta V_D$ (v) | $\Delta V_L$ (v) |
|---------|-----------------------|------------------|------------------|
| 23 | Example 1 | +10 | +15 |
| 24 | Example 6 | 0 | +20 |
| 25 | Example 8 | −10 | −10 |
| 26 | Example 13 | −15 | 0 |
| 27 | Example 22 | −10 | +10 |

Comparison Example 2

A photosensitive member made in accordance with Comparison Example 1 was tested in the same manner as Example 23 to measure changes in the potential after the repeated use. The results of this test were as follows.

$$\Delta V_D = -50 \text{ (v)} \quad \Delta V_L = +80 \text{ (v)}$$

As can be understood from the comparison between Example 24 and Reference Example 2, the change in the potential of the electrophotographic photosensitive member in accordance with the present invention after repeated use was smaller.

EXAMPLE 28

An undercoat layer of polyvinyl alcohol having a thickness of 0.5 μm was formed over an aluminum surface of a aluminum deposited polyethylene terephthalate film. An azo pigment dispersion liquid used in Example 6 was applied over this layer with a Meyer bar and was dried, thereby forming a charge generation layer having a thickness of 0.2 μm.

A liquid prepared by dissolving 5 g of a styryl compound represented by a structural formula:

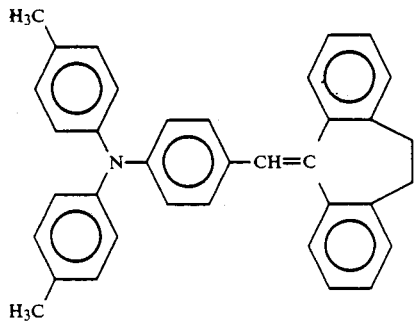

and 5 g of polycarbonate resin (number-average molecular weight: 55,000) in 40 g of tetrahydrofuran was applied over the charge generation layer, thereby forming a charge transport layer having a thickness of 20 μm. The electrification characteristics and durability of a photosensitive member made in this manner were measured in the same manner as Example 1 and Example 23. The results of the measurement were as follows.

Vo: 700 (−v) E1/2: 1.2 (lux.sec)

$\Delta V_D$: −5 (v) $\Delta V_D$: +5 (v)

EXAMPLE 29

A photosensitive member was made so that the member had the same charge generation layer and the same charge transport layer as those Example 8, but the layers were formed in the reverse order. The electrification characteristics of this photosensitive member were evaluated in the same manner as Example 1. The charging polarity was positive.

Vo: 680 (+V) E1/2: 1.8 (lux.sec)

EXAMPLE 30

A liquid prepared by dissolving 5 g of 2,4,7-trinitro-9-fluorenone and 5 g of poly-4,4-dioxydiphenyl 2 2'-propanecarbonate (molecular weight: 300,000) in 50 g of tetrahydrofuran was applied with a Meyer bar over the charge generation layer made in accordance with Example 6 and was dried, thereby forming a charge transport layer having a thickness of 18 μm.

The electrification characteristics of a photosensitive member made in this manner were evaluated in the same manner as Example 1. The charging polarity was positive.

Vo: 660 (+V) E½; 4.2 (lux.sec)

EXAMPLE 31

0.5 g of the azo pigment No.(2)-13 shown in the above list was dispersed into 9.5 g of cyclohexane by using a paint shaker for five hours. To this liquid was added a liquid prepared by dissolving 5 g of the charge transporting material used in Example 1 and 5 g of polycarbonate resin in 40 g of tetrahydrofuran, followed by further shaking for one hour. The coating liquid thereby prepared was applied over an aluminum base with a Meyer bar, thereby forming a photosensitive layer having a thickness of 20 μm.

The electrification characteristics of a photosensitive member made in this manner were evaluated in the same manner as Example 1. The charging polarity was positive.

Vo: 675 (+V) E½: 2.8 (lux.sec)

What is claimed is:

1. An electrophotographic photosensitive member comprising: an electroconductive support and a photosensitive layer formed on said support, said photosensitive layer containing an azo pigment expressed by a general formula [I] or [II]:

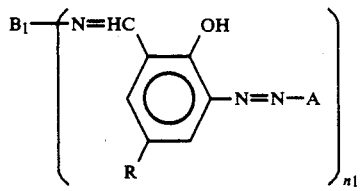

[I]

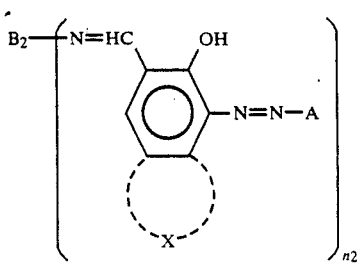

[II]

where A, $B_1$ and $B_2$ are each aromatic hydrocarbon nucleus groups, optionally linked by coupler groups or heterocyclic groups, optionally linked by coupler groups, A is an univalent group, $B_1$ is an univalent, bivalent or trivalent group, and $B_2$ is a bivalent or trivalent group; X is a residue necessary for forming a polycyclic aromatic nucleus or a heterocycle by condensation with a benzene nucleus; R is a halogen atom, an alkyl group or an alkoxy group; $n_1$ is an integer from 1 to 3; and $n_2$ is an integer from 1 to 3.

2. An electrophotographic photosensitive member according to claim 1, wherein said photosensitive layer is a laminate of a charge generation layer and a charge transport layer.

3. An electrophotographic photosensitive member according to claim 2, wherein said charge transport layer is laminated on said charge generation layer.

4. An electrophotographic photosensitive member according to claim 1, wherein said photosensitive layer contains a charge transport member.

5. An electrophotographic photosensitive member according to claim 1, further comprising an undercoat layer formed between said electroconductive support and said photosensitive layer.

6. An electrophotographic photosensitive member according to claim 1, wherein a protective layer is formed over said photosensitive layer.

* * * * *

UNITED STATES PATENT AND TRADEMARK OFFICE
CERTIFICATE OF CORRECTION

PATENT NO. : 4,988,593
DATED : January 29, 1991
INVENTOR(S) : HIDEYUKI TAKAI

It is certified that error appears in the above-identified patent and that said Letters Patent is hereby corrected as shown below:

COLUMN 1

Line 45, "above mentioned" should read --above-mentioned--.
    Line 53, "Laid Open" should read --Laid-Open--.
    Line 65, "Q" should be deleted.

COLUMN 34

Line 46, "p phenylenediamine" should read --p-phenylenediamine--.

COLUMN 35

Line 59, "port" should read --porting--.

COLUMN 36

Line 3, "material." should read --materials.--.
    Line 17, "poly N vinylcarbazole" should read --poly-N-vinylcarbazole--.
    Line 49, "3 mm." should read --3 µm.--.

COLUMN 37

Line 18, "of" should be deleted.
    Line 19, "alcohol soluble" should read --alcohol-soluble--.
    Line 63, "methy methacrylate" should read --methylmethacrylate--.

UNITED STATES PATENT AND TRADEMARK OFFICE
CERTIFICATE OF CORRECTION

PATENT NO. : 4,988,593
DATED : January 29, 1991
INVENTOR(S) : HIDEYUKI TAKAI

It is certified that error appears in the above-identified patent and that said Letters Patent is hereby corrected as shown below:

COLUMN 38

Line 3, "azo pigment No. (2) 1." should read
　　　　　--azo pigment No. (2)-1.--.

COLUMN 39

Line 60, "a" should read --an--.

COLUMN 40

Line 26, "$\Delta V_D$: +5(v)" should read --$\Delta V_L$: +5(v)--.

Signed and Sealed this

Eighteenth Day of August, 1992

Attest:

DOUGLAS B. COMER

Attesting Officer    Acting Commissioner of Patents and Trademarks